US011441990B2

(12) United States Patent
Smith et al.

(10) Patent No.: US 11,441,990 B2
(45) Date of Patent: Sep. 13, 2022

(54) SYSTEM AND METHOD FOR DETERMINING POLYMER FILAMENT RHEOLOGICAL PROPERTIES

(71) Applicant: BAYLOR UNIVERSITY, Waco, TX (US)

(72) Inventors: Douglas E. Smith, Woodway, TX (US); Jingdong Chen, Waco, TX (US)

(73) Assignee: Baylor University, Waco, TX (US)

( * ) Notice: Subject to any disclaimer, the term of this patent is extended or adjusted under 35 U.S.C. 154(b) by 495 days.

(21) Appl. No.: 16/403,667

(22) Filed: May 6, 2019

(65) Prior Publication Data

US 2020/0355593 A1    Nov. 12, 2020

(51) Int. Cl.
| | | |
|---|---|---|
| *G01N 11/06* | (2006.01) | |
| *G01N 11/00* | (2006.01) | |
| *G01N 11/04* | (2006.01) | |
| *G01N 11/08* | (2006.01) | |

(52) U.S. Cl.
CPC .............. *G01N 11/06* (2013.01); *G01N 11/04* (2013.01); *G01N 11/08* (2013.01); *G01N 2011/002* (2013.01); *G01N 2011/0026* (2013.01)

(58) Field of Classification Search
CPC ........ G01N 11/08; G01N 11/06; G01N 11/04; G01N 2011/0026; G01N 2011/002
See application file for complete search history.

(56) References Cited

U.S. PATENT DOCUMENTS

2018/0015655 A1\* 1/2018 Gheorghescu .......... B29C 48/18

OTHER PUBLICATIONS

Coogan, T.J., Kazmer, D.O., "In-line rheological monitoring of fused deposition modeling", Journal of Rheology, Jan./Feb. 2019, pp. 141-155, vol. 63(1), The Society of Rheology.
Anderegg, D.A, Bryant, H.A., Ruffin, D.C., Skrip JR, S.M., Fallon, J.J., Gilmer, E.L., Bortner, M.J., "In-situ monitoring of polymer flow temperature and pressure in extrusion based additive manufacturing", Additive Manufacturing, Jan. 15, 2019, pp. 76-83, vol. 26, Elsevier B.V.

(Continued)

*Primary Examiner* — Paul M. West
(74) *Attorney, Agent, or Firm* — Jackson Walker, LLP

(57) ABSTRACT

The present disclosure provides a low-cost and accurate rheometer system and method capable of determining melt flow rheological properties of polymers, such as from Fused Filament Fabrication ("FFF") polymeric materials. The device can include a filament feeding system, liquefier for filament melting, force transducer for measuring filament feeding force, and a temperature control system for controlling polymer melt temperatures. An electronic control system can capture data and manage operations. The system can measure a filament velocity and filament force required to extrude the FFF filament for printing. The filament velocity and force data can be used to compute data sets of melt volumetric flow relative to pressure drop across a FFF nozzle. An inverse analysis process transforms the computed data sets through nonlinear curve fitting to determine rheological parameters, independent of the customary calculation of apparent viscosity from shear stress and strain rate, that can assist in controlling the filament deposition.

15 Claims, 6 Drawing Sheets

(56) References Cited

OTHER PUBLICATIONS

Seppala, J.E., Han, S.H., Hillgartner K.E., Davis, C.S., Migler, K.B., "Weld formation during material extrusion additive manufacturing", Soft Matter Journal, 2017, pp. 6761-6769, vol. 13, The Royal Society of Chemistry.

"Power-law fluid", Wikipedia, https://en.wikipedia.org/wiki/Power-law_fluid, printed Mar. 29, 2019, 2 pages.

Turner, B.N., Strong, R., Gold, S.A., "A review of melt extrusion additive manufacturing processes: I. Process design and modeling", Rapid Prototyping Journal, 2014, pp. 192-204, vol. 20 No. 3, Emerald Group Publishing Limited.

Nikzad, M., Masood, S.H., Sbarski, I., Groth, A., "Rheological Properties of a Particulate-filled Polymeric Composite through Fused Deposition Process", Materials Science Forum, 2010, pp. 2471-2474, vols. 654-656, Trans Tech Publications, Switzerland.

Ramanath, H.S., Chua, C.K., Leong, K.F., Shah, K.D., "Melt flow behaviour of poly-E-caprolactone in fused deposition modelling", J Mater Sci: Mater Med, Jul. 10, 2007, pp. 2541-2550, vol. 19, Springer Science+Business Media, LLC.

Bellini, A., Guceri, S., Bertoldi, M., "Liquefier Dynamics in Fused Deposition", Journal of Manufacturing Science and Engineering, May 2004, pp. 237-246, vol. 126, ASME.

\* cited by examiner

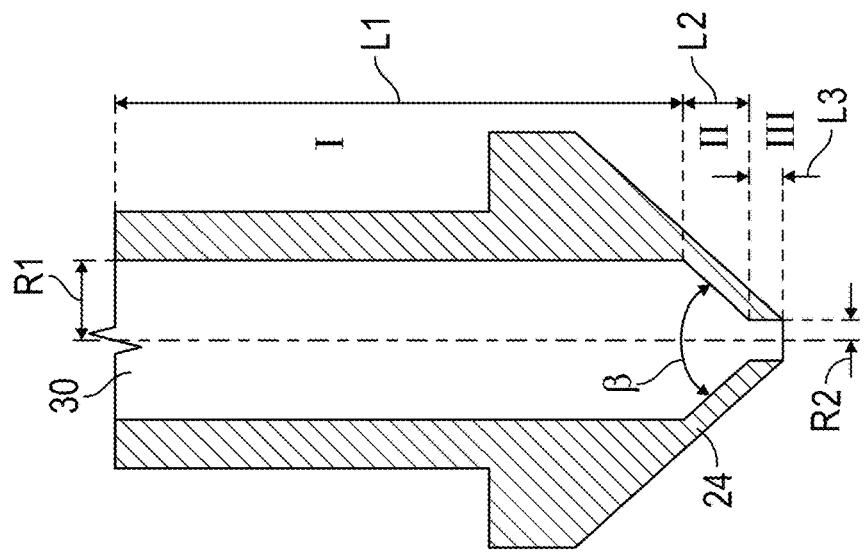
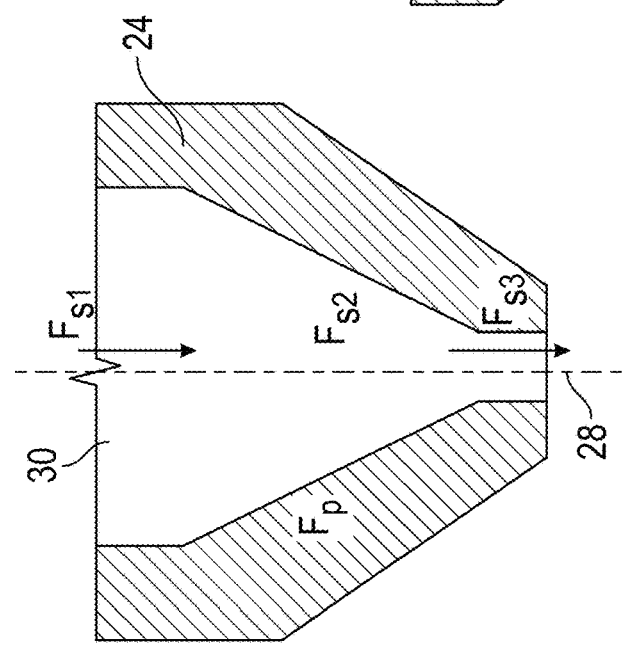
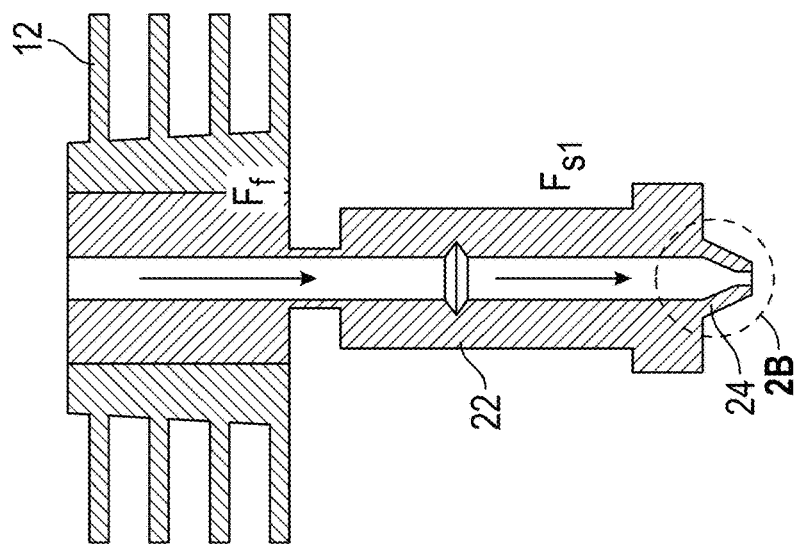
FIG. 2C
FIG. 2B
FIG. 2A

Shear Rate Range 50-280s⁻¹

SYSTEM AND METHOD FOR DETERMINING POLYMER FILAMENT RHEOLOGICAL PROPERTIES

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to non-Newtonian viscous fluids. Specifically, the disclosure relates to using non-Newtonian viscous fluids in Fused Filament Fabrication (FFF).

Description of the Related Art

A Newtonian fluid is a fluid in which the viscous stresses arising from its flow, at every point, are linearly proportional to the local strain rate—the rate of change of its deformation over time. A Newtonian fluid model is the simplest mathematical model of fluids that account for viscosity. Many common liquids and gases, such as water and air, can be assumed to be Newtonian medium for practical calculations under ordinary conditions.

A non-Newtonian fluid is a fluid that does not follow Newton's law of viscosity, that is, a fluid having a constant viscosity independent of stress. Non-Newtonian fluids are relatively common, and include oobleck (which becomes stiffer when vigorously sheared, known as shear thickening), or non-drip paint (which becomes thinner when sheared, known as shear thinning). Other examples include many polymer solutions, molten polymers, molten fiber-filled polymer composites, many solid suspensions, blood, and most highly viscous fluids. In non-Newtonian fluids, viscosity can change when under force to either more liquid or more solid. Ketchup, for example, becomes runnier when shaken and is thus a non-Newtonian fluid. Many salt solutions and molten polymers are non-Newtonian fluids, as are many commonly found substances such as toothpaste, starch suspensions, paint, and shampoo.

Although the concept of viscosity is commonly used in fluid mechanics to characterize the shear properties of a fluid, it can be inadequate to describe non-Newtonian fluids. A parameter known as "apparent viscosity", a single viscosity measurement at a constant flow rate, can be applied to purely viscous Newtonian and non-Newtonian fluids. For a Newtonian fluid, apparent viscosity is constant and equal to the Newtonian coefficient of viscosity of the fluid. In a non-Newtonian fluid, the apparent viscosity depends on the shear rate and so the coefficient changes with the shear rate, that is, the relationship is not constant between the shear stress and the shear rate. In more detail, apparent viscosity r is the shear stress T applied to a fluid divided by the shear rate $\dot{\gamma}$. Shear stress is the component of stress evaluated coplanar with a material cross section. Shear stress is from a force vector component parallel to the cross section of the material. Normal stress, on the other hand, is from the force vector component perpendicular to the material cross section on which it acts. Shear rate is the rate of change at which a progressive shearing deformation is applied to some material. In field, rheological properties are used in fluid models typically with constants in formulas that relate stress and strain rate under different flow conditions.

The flow conditions are typically measured using a rheometer to determine the rheology of the fluid. A rheometer is a laboratory device used to measure the way in which a liquid, suspension, or slurry flows in response to applied forces. A rheometer is used for those fluids which cannot be defined by a single value of viscosity and therefore require more parameters to be set and measured than is the case for a viscometer. There are two types of rheometers. Rheometers that control the applied shear stress or shear strain rate are called shear rheometers (where common types include rotational and capillary rheometers), whereas rheometers that apply extensional stress or extensional strain rate are extensional rheometers. Rheometers are usually designed as either a native strain-rate-controlled instrument (control and apply a user-defined shear strain rate that can then measure the resulting shear stress) or a native stress-controlled instrument (control and apply a user-defined shear stress and measure the resulting shear strain rate). Laboratory size rheometers are typically expensive (on the order of tens of thousands of dollars) and require a relatively high level of expertise in operation and sample preparation.

Among many types of rheometers, a capillary (or "pipe") rheometer is often used as a type of shear rheometer. In a capillary rheometer, a liquid or semi-liquid is pushed through a tube of constant cross-section and precisely known dimensions under conditions of laminar flow. Either the flow-rate or the pressure drop are fixed and the other measured. Knowing the dimensions, the volumetric flow-rate can be converted into a single value of wall shear strain rate and the pressure drop into a single value of wall shear stress. Varying the pressure allows a flow curve to be determined. When a relatively small amount of fluid is available for rheometric characterization, a microfluidic rheometer with embedded pressure sensors can be used to measure pressure drop for a controlled flow rate.

The interest and practical application of rheometric characterization has increased with the advent of Fused Filament Fabrication (FFF) in Additive Manufacturing (AM), also known as "3D printing." A FFF process generally uses a relatively rigid filament feedstock delivered by an extruder through a liquefier to build up the object layer by layer on a surface through deposition from digital data. FFF is gaining in widespread use primarily due to its low cost and availability of materials. Unfortunately, a typical consumer of the technology knows little about the material or its processing during the 3D printing operation. There are limited resources available to the consumer for characterizing both new and existing print materials. The lack of quality materials and quality control of the process leads to imperfect prints and substandard material properties in the final part. Currently, drawbacks of FFF from polymer (herein including polymer composites and thermoplastics) filaments include weak inter-bead adhesion, warpage, and voids with the resultant compromising of mechanical properties, especially in the direction normal to the print plane. Understanding the behavior of polymer melt flows is important for predicting final part quality and improve processing performance, particularly in FFF.

Others have attempted to control the FFF process using measured properties but have relied on traditional approaches to determine rheological properties. For example, T. J. Coogan and D. O. Kazmer, "In-line rheological monitoring of fused deposition modelling," J. Rheol. 63(1), 141-155, January/February 2019 ("Coogan") discloses an in-line rheometer incorporated into a fused deposition modeling printer by designing a modified nozzle with a custom pressure transducer and a thermocouple for measuring the processed melt temperature. A capillary type rheometer measurement is made using the pressure drop through the final small capillary portion of the nozzle. Coogan appears to calculate a Newtonian wall shear stress and strain rate, and uses standard capillary rheometer based correction factors on the wall shear and a corrected wall strain rate for the non-Newtonian flow to obtain values of apparent viscosity. Coogan fits a non-Newtonian viscosity fluid model to the data as is standard in rheometric measurement. The presented data seems to indicate significant errors compared to standard rheological results possibly due to an inapplicability of the standard capillary rheometer process to the FFF nozzle flow.

D. A. Anderegg, H. A. Bryant, D. C. Ruffin, S. M. Skrip, Jr., J. J. Fallon, E. L. Gilmer, and M. J. Bortner, "In-situ monitoring of polymer flow temperature and pressure in extrusion based additive manufacturing," Additive Manufacturing 26, 76-83 (2019) ("Anderegg") discloses an approach that is similar to Coogan in that the disclosed system measures pressure drop and flow rate through the capillary section of the FFF nozzle, computes a wall shear strain rate and apparent viscosity using a different fluid model than Coogan, and then fits a power-law fluid viscosity fluid model to the data. The computation of rheology data follows the typical capillary rheometer approach, as in Coogan. This paper presents a three pressure drops through the nozzle, but appears to only consider the pressure drop in the final capillary portion in the viscosity calculations as Coogan did, using a capillary type rheometer approach.

A. Bellini, S. Guceri, and M. Bertoldi, "Liquefier Dynamics in Fused Deposition," ASME Jn. Manufacturing Science and Engineering 126, 237-246 (2004) ("Bellini"), presents a FFF liquefier dynamics fluid model that includes a polymer melt flow analysis through the FFF nozzle. The nozzle fluid model predicts pressure drop in the three regions of the FFF nozzle as a function of flow rate and polymer rheological properties. A power-law viscosity fluid model is assumed, and the pressure drop equations follow from prior extrusion die analysis methods. A temperature component is included for relating fluid dynamics to thermal dynamics in the liquefier. Power applied on the stepper motor and the corresponding output torque is obtained from the analytical pressure drop calculated from the given power-law parameters and are then compared to the measurements. The validity of this mathematical model has been verified by comparing the curves of reaction of theoretical and experimental volumetric flow rate, hear flow rate, power, and torque to the abrupt changing of filament feeding rate. This paper provides a means for computing pressure drop given that the polymer rheology parameters are known, but does not suggest an approach for determining these parameters using the presented analytical approach on the invention herein.

J. Seppala, S. H. Han, K. E. Hillgartner, C. S. Davis, and K. B. Migler, "Weld formation during material extrusion additive manufacturing," Soft Matter 13, 6761-6769 (2017) ("Seppala"), studies interface between beads formed in FFF. Seppala's approach appears to rely on a relationship between relaxation time and temperature that is established through rheological measurements. Apparent viscosity is measured based on a wall strain rate for ABS, where a power-law fluid model is assumed to compute the desired outcomes. This paper appears to use standard rheological expressions to obtain viscosity data from capillary rheometer tests.

Turner, B. N., and S. A. Gold, "A review of melt extrusion additive manufacturing processes: II. Materials, dimensional accuracy, and surface roughness," Rapid Prototyping J. 21, 250-261 (2015) ("Turner") reviews modeling and design methods for polymer deposition FFF processes. The document presents a three-stage pressure drop model that assumes a power-law fluid model. This three-stage pressure drop model is the same as described in Bellini. As a review paper, it does not present any new measured or simulated data. This paper presents models and does not include any information on measuring rheology data with FFF components.

Ramanath, H. S., C. K. Chua, K. F. Leong, and K. D. Shah, "Melt flow behaviour of poly-$\epsilon$-caprolactone in fused deposition modelling," J. Mater. Sci. Mater. Med. 19, 2541-2550 (2008) ("Ramanath") models the deposition process for an FFF system that includes several sections for pressure drop in the filament flow path. The document assumes a power-law fluid model for the several sections and uses customary rheometric procedures to obtain a power-law fluid model for the polymer. The document studies melt flow behavior that suggests the pressure drop and velocity of the melt flow depend on the flow channel parameters, and that the temperature gradient of the melt shows that it liquefies within a certain percentage of the channel length.

Nikzad, M., S. H. Masood, I. Sbarski, and A. M. Groth, "Rheological properties of a particulate-filled polymeric composite through fused deposition process," Mater. Sci. Forum 654, 2471-2474 (2010) ("Nikzad"), considers the rheological properties of an iron-filled ABS composite material for use in the FFF process. The paper describes the preparations of the composite and customary rheological testing to obtain a fluid model for viscosity. Nikzad uses a capillary rheometer and analyzes the data with customary rheological procedures, including the computation of wall shear stress and strain, and the use of the known Rabinowitsch-Mooney equation (as in Coogan and others) that is applicable to any fluid having a shear rate dependent on viscosity.

Therefore, there remains a need to provide a low-cost but accurate rheometer system and method capable of directly measuring parameters, such as from an FFF filament, that result in melt flow rheological properties of polymers.

BRIEF SUMMARY OF THE INVENTION

The present disclosure provides a simplified, low-cost, and accurate rheometer system and method capable of measuring melt flow rheological properties of polymers, polymer composites, fiber filled polymer composites, and other thermoplastics (collectively defined herein as "polymers) directly, such as from Filament Fused Fabrication ("FFF") polymeric materials. The device can include a filament feeding system with a speed measurement capability, a liquefier for melting the filament, a force transducer for measuring a filament feeding force, and a temperature control system for maintaining the polymer melt temperature. An electronic control system can capture data and manage various operations. The system can measure filament feeding rate to determine the filament velocity and measure the filament force required to extrude the FFF filament through a nozzle for deposition, such as printing. The filament velocity and force data can be used to compute polymer melt volumetric flow and pressure drop across the FFF nozzle. An inverse analysis process transforms the computed data sets of polymer melt volumetric flow and pressure drop through nonlinear curve fitting to determine rheological parameters with a high degree of accuracy compared to laboratory rheometers, independent of the customary calculation of apparent viscosity from shear stress and strain rate. The system and method results in a high degree of accuracy at a small fraction of the costs of a laboratory rheometer, allowing the disclosed system and method to be integrated into an FFF process. The system and method can assist in controlling accurately the material's deposition for quality components.

The disclosure provides a system for determining rheological properties of a polymer filament having a filament cross section area, comprising: a filament feeding system configured to feed the filament through the filament feeding system and determine a speed of the filament passing through the filament feeding system; a liquefier configured to at least partially melt the filament, the liquefier having a nozzle with a nozzle flow path, the nozzle flow path having at least a region of a smaller cross-sectional area than a cross-sectional area of the filament through the filament feeding system; a force transducer coupled to the liquefier and configured to provide force data to measure a filament force caused by the filament feeding system on the liquefier nozzle through feeding the filament, and a temperature sensor for measuring temperature of the liquefier, the at least partially melted filament, or a combination thereof.

The disclosure also provides a method of determining rheological properties of a polymer filament based on force and volumetric flow rate in a system having a filament feeding system, a liquefier having a nozzle, a forced transducer, and a temperature sensor, comprising: feeding the filament through the filament feeding system; heating the liquefier and at least partially liquefying the filament for passing through the nozzle; measuring a filament force caused by the filament feeding system to feed the filament through the nozzle; measuring a filament speed through the system to determine a filament volumetric flow rate through the system; forming multiple data sets of filament force with filament volumetric flow rate; applying the filament force and the volumetric flow rate to a fluid model having one or more rheological constants to derive a relationship formula of the filament force and volumetric flow rate to the fluid model; and determining the rheological constants by applying the data sets of filament force with filament volumetric flow rate to fluid model.]

BRIEF DESCRIPTION OF THE SEVERAL VIEWS OF THE DRAWINGS

FIG. 2A is a schematic cross-sectional view of a portion of the liquefier in FIG. 1B.

FIG. 2B is an enlarged schematic cross-sectional view of the nozzle in FIG. 2A with force vectors for a composite force computation in multiple flow regions of the nozzle.

FIG. 2C is an enlarged schematic cross-sectional view of the nozzle of FIG. 2B, illustrating multiple flow regions in the nozzle.

DETAILED DESCRIPTION

Figure 1A:
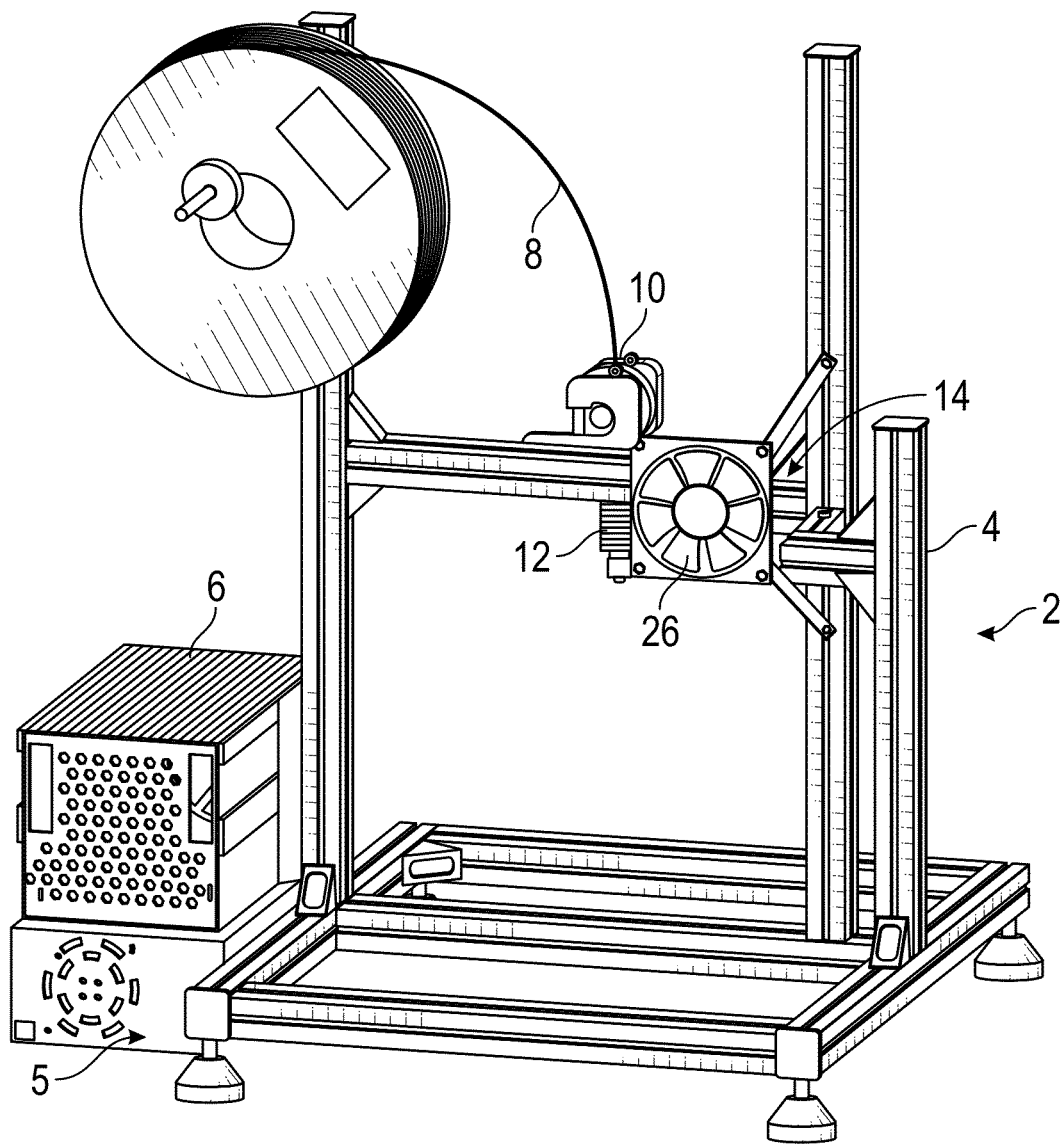
FIG. 1A is a schematic perspective view of an example of an FFF system having features disclosed in the invention.

The Figures described above and the written description of specific structures and functions below are not presented to limit the scope of what Applicant has invented or the scope of the appended claims. Rather, the Figures and written description are provided to teach any person skilled in the art how to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The terms "top", "up", "upward", "bottom", "down", "downwardly", and like directional terms are used to indicate the direction relative to the figures and their illustrated orientation and are not absolute relative to a fixed datum such as the earth in commercial use. The term "inner," "inward," "internal" or like terms refers to a direction facing toward a center portion of an assembly or component, such as longitudinal centerline of the assembly or component, and the term "outer," "outward," "external" or like terms refers to a direction facing away from the center portion of an assembly or component. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unitary fashion. The coupling may occur in any direction, including rotationally. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions. Some elements are nominated by a device name for simplicity and would be understood to include a system of related components that are known to those with ordinary skill in the art and may not be specifically described. Some elements are described with a given element number and where helpful to describe embodiments with various examples provided in the description and figures that perform various functions and are non-limiting in shape, size, description, but serve as illustrative structures that can be varied as would be known to one with ordinary skill in the art given the teachings contained herein. Element numbers with suffix letters, such as "A", "B", and so forth, are to designate different elements within a group of like elements having a similar structure or function, and corresponding element numbers without the letters are to generally refer to one or more of the like elements.

The present disclosure provides a simplified, low-cost, and accurate rheometer system and method capable of measuring melt flow rheological properties of polymers, polymer composites, fiber filled polymer composites, and other thermoplastics (collectively defined herein as "polymers) directly, such as from Filament Fused Fabrication ("FFF") polymeric materials. The device can include a filament feeding system with a speed measurement capability, a liquefier for melting the filament, a force transducer for measuring a filament feeding force, and a temperature control system for maintaining the polymer melt temperature. An electronic control system can capture data and manage various operations. The system can measure filament feeding rate to determine the filament velocity and measure the filament force required to extrude the FFF filament through a nozzle for deposition, such as printing. The filament velocity and force data can be used to compute polymer melt volumetric flow and pressure drop across the FFF nozzle. An inverse analysis process transforms the computed data sets of polymer melt volumetric flow and pressure drop through nonlinear curve fitting to determine rheological parameters with a high degree of accuracy compared to laboratory rheometers, independent of the customary calculation of apparent viscosity from shear stress and strain rate. The system and method results in a high degree of accuracy at a small fraction of the costs of a laboratory rheometer, allowing the disclosed system and method to be integrated into an FFF process. The system and method can assist in controlling accurately the material's deposition for quality components.

Figure 1B:
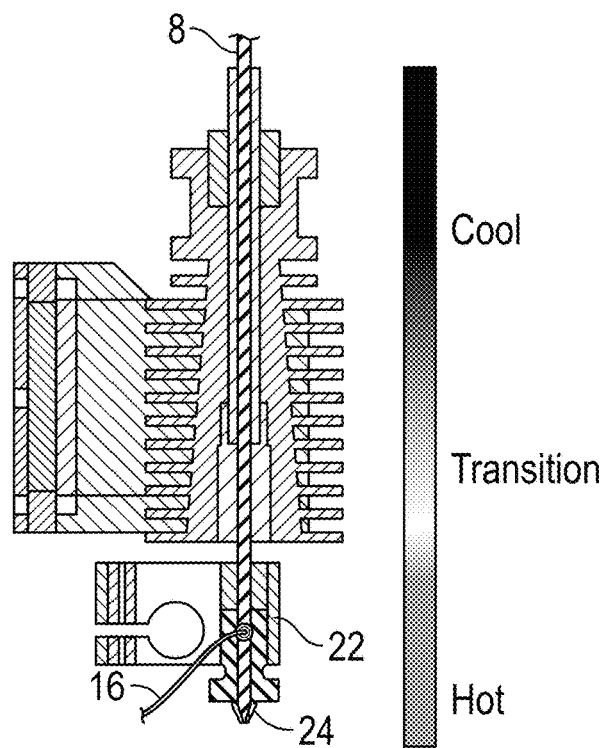
FIG. 1B is a schematic cross-sectional view of an example of a filament liquefier.
Figure 1C:
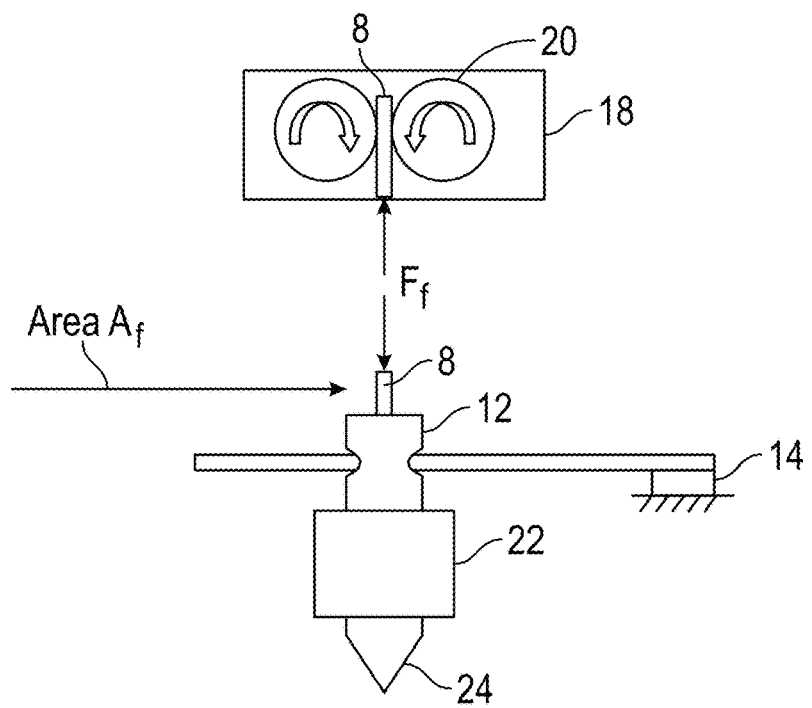
FIG. 1C is a schematic side view an example of a force measuring component, such as a strain gage transducer, attached to the extruder and liquefier of FIG. 1A.

FIG. 1A is a schematic perspective view of an example of an FFF filament rheometer system having features disclosed in the invention. FIG. 1B is a schematic cross-sectional view of an example of a filament liquefier. FIG. 1C is a schematic side view an example of a force measuring component, such as a strain gage transducer, attached to the extruder and liquefier of FIG. 1A. The system number 2 includes a support 4 to mount the various components that are generally commercially available. A power supply 5 and controller 6 provides power to the system and control of filament feed, temperature, data collection, processing, extrusion of the heated filament, and other electronic functions. (The power supply and controller can be separate units or a combined unit having both functions.) A supply of filament 8 is provided to a filament feeding system 10, such as an extruder (hereinafter "extruder 10"). In at least one embodiment, the extruder 10 generally includes a stepper motor 18 coupled to gears and/or rollers 20 that can friction grip the filament to feed the filament 8 through the system. The controller 6 can control the speed of the stepper motor and therefore knows the revolutions per minute (RPM) at different times in the process that with the effective diameter of the gears and/or rollers can be used to calculate the filament linear velocity and hence volumetric flow rate. A filament liquefier 12 can receive the filament from the extruder. A filament liquefier 12 includes a hot end 22 for melting the filament and a nozzle 24, having an exit with a smaller diameter than the manufactured filament diameter, through which the melted polymer is extruded for placement onto the deposition surface. In the exemplary embodiment, the liquefier 12 is mounted to a load cell 14 independently of the extruder 10. The load cell 14 can include a strain gage or other force measurement instrument. The load cell can measure a force that is applied to the filament by the extruder feeding the filament into the liquefier and pushes the filament through the nozzle to establish a measured filament force. The filament force accounts for the force over the cross-sectional area of the filament through the different geometries and flow regions of the nozzle. Thus, the filament force is the overall force that does not need to measure pressure and associated pressure drops or calculate wall shear stress or strain rates to determine the rheological features and greatly simplifies the process.

A temperature sensor 16, such as a thermistor and/or thermocouple, can measure the temperature of the hot end for temperature control in the FFF process. In at least one embodiment, efforts made to obtain reliable data from generally low-cost components include: measuring the force on the filament to push the filament through the nozzle, electronically filtering the force output to reduce electronic noise, accurately determining the speed of the filament through the extruder for a volumetric flow rate, assessing the nozzle geometry for characterizing flow geometry regions in the nozzle to compute pressure drop with the data, and control of the melt temperature and filament feed system.

Assuming the pressure is zero at the exit of the nozzle and negligible force to push the filament in the liquefier other than through the nozzle flow regions discussed below, then the Ff divided by the filament cross-sectional area Af yields the overall pressure drop through the nozzle.

$$\Delta P = F_f / A_f \qquad [1]$$

The volumetric flow rate Q is equal to the filament velocity v multiplied by the filament cross-sectional area Af. Depending on the extruder mechanism, the filament velocity can be computed by computing the revolutions per time period of a gear or pulley with an effective radius of r multiplied by the circumference (2πr) of the drive gear or pulley. For example, by monitoring the RPM of the drive gear or roller on a stepper motor 18 in FIG. 1 for the filament feed, the filament velocity can be expressed as:

$$Q = v \times Af = 2\pi r \text{RPM}/60 \times Af \qquad [2]$$

FIG. 2A is a schematic cross-sectional view of a portion of the liquefier in FIG. 1B. FIG. 2B is an enlarged schematic cross-sectional view of the nozzle in FIG. 2A with force vectors for a composite force computation in multiple flow regions of the nozzle. FIG. 2C is an enlarged schematic cross-sectional view of the nozzle of FIG. 2B, illustrating multiple flow regions in the nozzle. The filament 8 is pushed through the nozzle 24 of the liquefier 12 with a filament force Ff as the filament is melted and deposited. The overall force is dependent on the characterization of the nozzle and each flow region that heretofore does not appear to have been applied in the manner of the present invention to determine rheological properties.

The nozzle 24, as an example, can be characterized as having three flow regions through a nozzle flow path 30. Other nozzles and shapes can be used and the principles disclosed herein can be applied to other nozzles and their shapes, including nozzles having spherically-shaped transitions between regions in the nozzle flow path. For the exemplary nozzle shown in FIGS. 2A-2C, Region I is the first region in the flow path that is generally cylindrically shaped of about the diameter of the manufactured filament diameter and so is modeled as having a radius R1 (substantially equal to the filament radius) with a length of L1. The nozzle is generally symmetrically shaped about a longitudinal axis 28. The cylindrical Region I generally has shear stresses along the cylindrical wall that results generally in an axial force Fs1 to push the filament through Region I with a resulting pressure drop ΔP1. Skipping Region II as a second flow region for the moment, Region III is a third flow region that like Region I is generally cylindrically shaped but has a smaller diameter than the manufactured filament diameter and therefore smaller than the diameter in Region I. Region III is modeled as having a radius R2 with a length of L3, generally having shear stresses along the cylindrical wall that results generally in an axial force Fs3 to push the filament through Region III with a resulting pressure drop ΔP3. Region II, as the second region, typically forms a conical shape (however other shapes may be used to facilitate the reduction in diameter between Region I and Region III) to transition between Region I and Region III. The force on the molten polymer in Region II can be computed by considering the interior surface of the conical section and force vectors at trigonometry angles. Region II has a starting radius of R1 from Region 1 and a smaller, ending radius of R2 from Region III with a length of L2. The conical shape has an included angle β from side to side of the interior angular conical surface, that is, β/2 from a side to the longitudinal axis 28. Region II has a shear stress along the angled cone surface that results in a force Fs2 to push the filament through Region II along the conical surface. Fs2 can be expressed in trigonometric functions using angle β with force vectors that are parallel and perpendicular to the centerline 28. The conical surface in Region II also results in a force Fp that is perpendicular to the angled cone surface that is required to overcome to push the filament through Region III. Fp can likewise be expressed in trigonometric functions using angle β and force vectors that are parallel and perpendicular to the centerline 28. The total force through Region II is the combination of the trigonometry components of Fs2 and Fp with a resulting pressure drop ΔP2. The total force of the Regions with their individual forces generally equals the Ff that is measured by the load cell 14 in FIG. 1C with some assumptions such as no slippage and minimal force loss between the stepper motor and the liquefier nozzle. Combining each Region's force component Fs1, Fs2 and Fp, and Fs3, for the overall filament force Ff, the equation for this shape of nozzle can be expressed as:

$$Ff = Fs1 + (Fs2 \cos \beta/2 + Fp \sin \beta/2) + Fs3 \qquad [3]$$

The total pressure drop through the nozzle can be expressed as:

$$\Delta P = \Delta P_1 + \Delta P_2 + \Delta P_3 \qquad [4]$$

Having established some basic relationships in the forces, volumetric flow rate, and pressure drops, a fluid model for non-Newtonian fluids is needed to relate the forces, volumetric flow rates, and pressure drops to rheological properties. One exemplary and nonlimiting model is a power-law fluid model that describes the shear thinning effect of melt viscosity as a function of shear rate, especially of a purely viscous non-Newtonian fluid. Modeling assumptions include: isothermal melt flow, low Reynolds number flow, no inertia, gravity is negligible, and no slip at the interior walls of the nozzle. The power-law fluid model has the general equation below, where n is the power-law index (dimensionless), k is the flow consistency index (in Pa.s), η is the viscosity, and $\dot{\gamma}$ is the shear strain rate.

$$\eta(\dot{\gamma}) = k\dot{\gamma}^{n-1} \qquad [5]$$

In the present disclosure, the measurement of filament force Ff and the volumetric flow rate Q can be used to find the rheological constants n and k to make real time (or at least quick) adjustments in operating conditions for filament deposition, such as flow rate or temperature for quality control.

By combining aspects of Equations [1], [2], [3], and [5], and fundamental equations of momentum balance, the pressure drop in each of Region I, II, and III can be expressed as:

Region I $$\Delta P_1 = 2kL_1 \left( \frac{Q(1/n+3)}{\pi R_1^{3+1/n}} \right)^n \qquad [6]$$

Region II $$\Delta P_2 = \frac{2k \cot \frac{\beta}{2}}{3n} \left( \frac{Q\left(\frac{1}{n}+3\right)}{\pi} \right)^n (R_2^{-3n} - R_1^{-3n}) \qquad [7]$$

Region III $$\Delta P_3 = 2kL_3 \left( \frac{Q(1/n+3)}{\pi R_2^{3+1/n}} \right)^n \qquad [8]$$

Combining the three equations [6], [7], and [8] for the Regions as in Equation [4] and simplifying, the combined pressure drop through the entire nozzle can be expressed as:

$$\Delta P = 2k \left( \frac{Q\left(\frac{1}{n}+3\right)}{\pi} \right)^n \left[ \frac{L_1}{R_1^{3n+1}} + \frac{\cot\frac{\beta}{2}}{3n}(R_2^{-3n} - R_1^{-3n}) + \frac{L_3}{R_2^{3n+1}} \right]$$

Importantly, the disclosed method differs from prior efforts. Starting with the overall filament force, the different regions can be all be accounted for even with non-Newtonian shear rates and shear stresses. The measurement of the filament force and the volumetric flow rate, and the equation above for pressure drop through all three regions of the nozzle provides a basis for backwards calculating through an inverse analysis to find the rheological properties. The inverse analysis using the filament force and volumetric flow rate provides greater accuracy and simplicity for determining the rheological properties rather than starting with the pressure drops in just one flow region measured through standard rheological procedures for calculating rheological properties as in prior efforts. Some prior efforts that measured filament force did not use force for determining the rheological properties.

Figure 3:
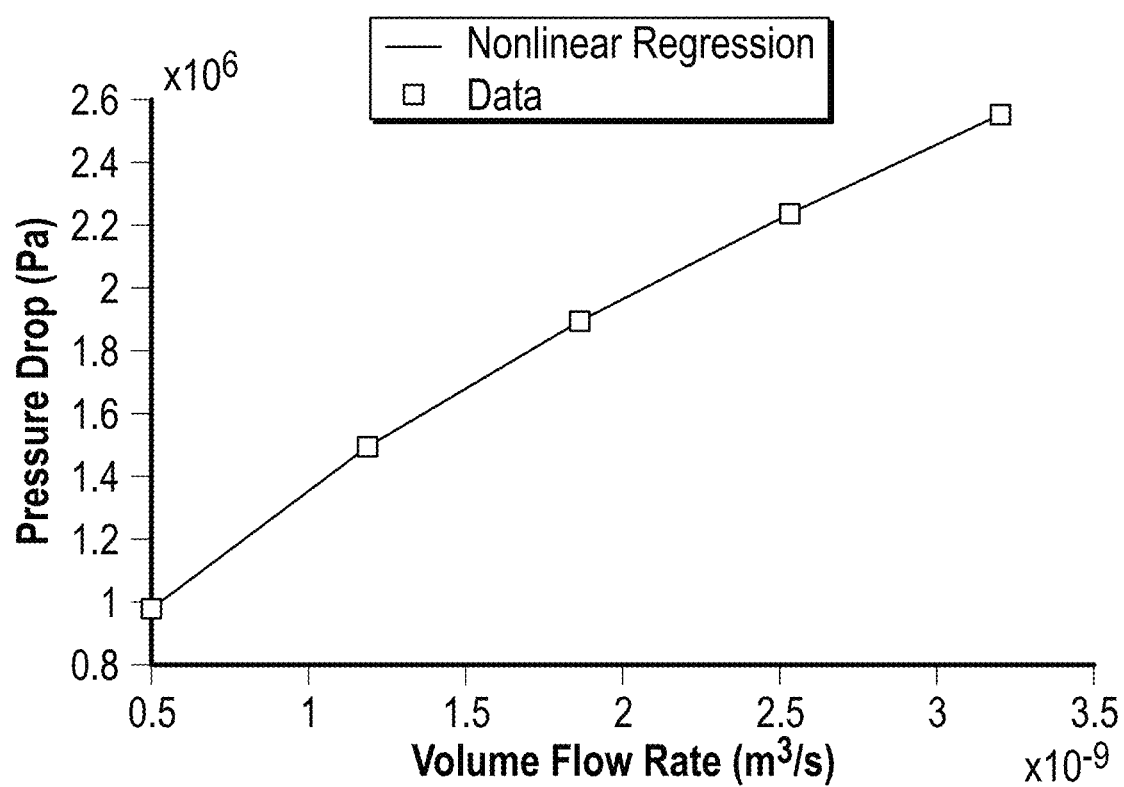
FIG. 3 is a schematic graph of an example of a non-linear curve fit of pressure drop compared to volumetric flow rate where both axes were computed directly from simple measurements of filament velocity and force on the filament to push though the nozzle.

FIG. 3 is a schematic graph of an example of a non-linear curve fit of pressure drop compared to volumetric flow rate where both axes were computed directly from simple measurements of filament velocity and force on the filament to push though the nozzle. The non-linear equations can be non-linearly curve fitted. An exemplary inverse analysis approach based on a nonlinear curve fitting method employs the Gauss-Newton method to compute the power-law constants, n and k, for a given material from measured filament force and filament velocity for a volumetric flow rate. By providing the constants n and k for a given material, the power-law model rheological properties are defined for that material. Typically, the constants n and k are given and so the forward calculation of the behavior of a material at a given flow rate can be predicted with the unknown error in the constant for the particular batch of material that may vary the quality and performance of the batch.

Figure 4A:
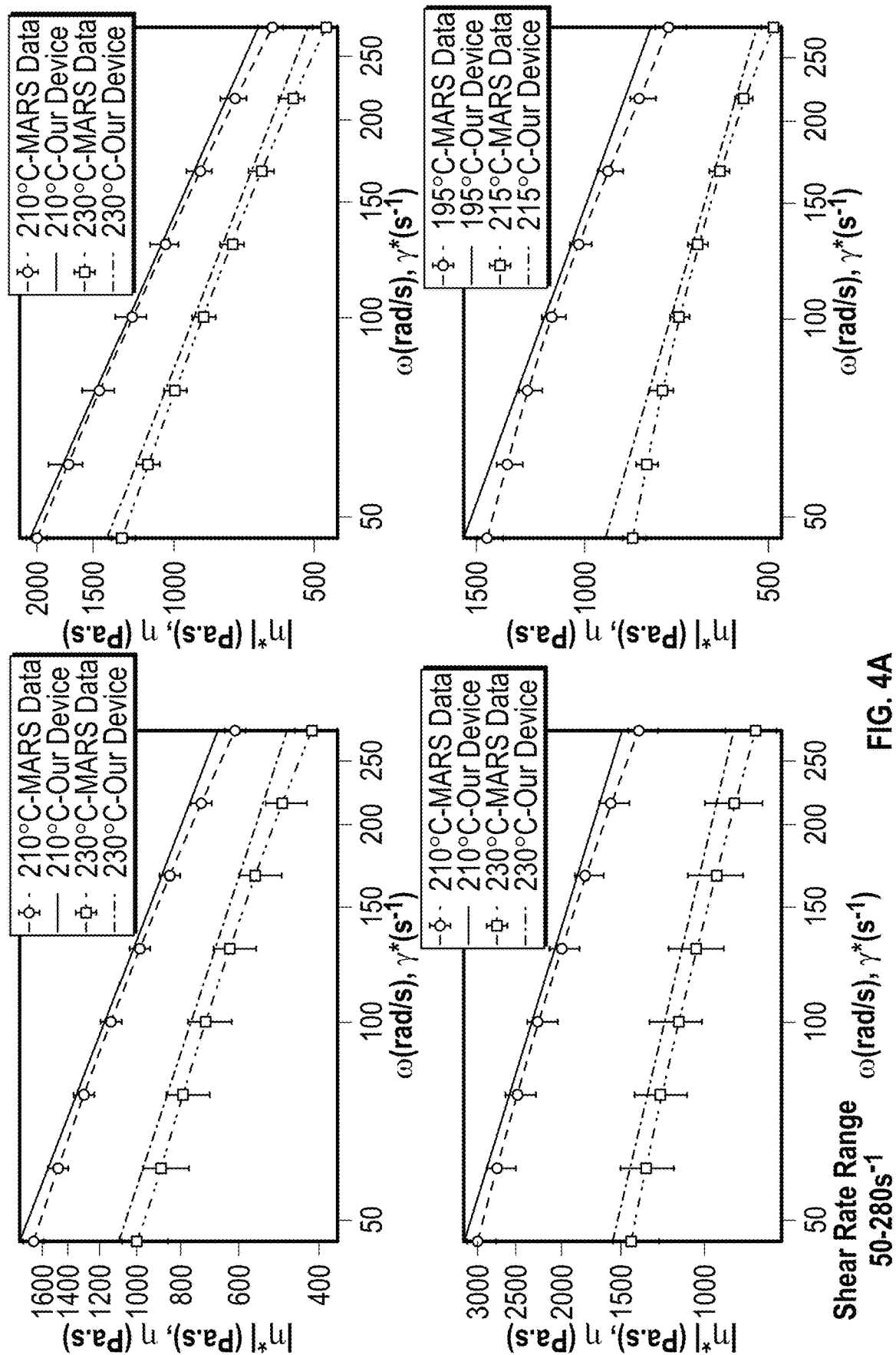
FIG. 4A is a schematic composite graph of a rheological comparison of four commercially available unfilled polymer filament materials using the rheological method and system of the invention in close comparison to the results using a well-known laboratory rotational rheometer.
Figure 4B:
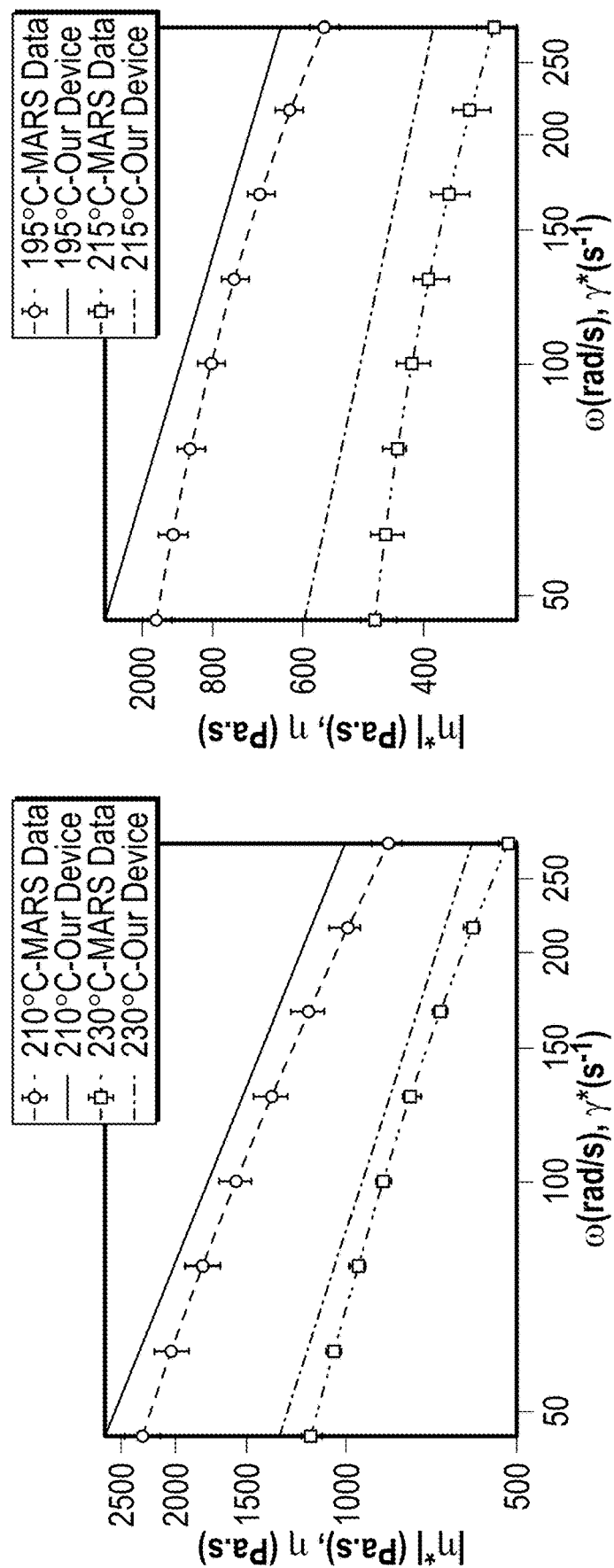
FIG. 4B is a continuation of FIG. 4A as a schematic composite graph of a rheological comparison of two commercially available carbon-fiber filled polymer filament materials for a total of six, using the rheological method and system of the invention in close comparison to the results using a well-known laboratory rheology meter.

FIG. 4A is a schematic composite graph of a rheological comparison of four commercially available unfilled polymer filament materials using the rheological method and system of the invention in close comparison to the results using a well-known laboratory rotational rheometer. FIG. 4B is a continuation of FIG. 4A as a schematic composite graph of a rheological comparison of two commercially available carbon-fiber filled polymer filament materials for a total of six, using the rheological method and system of the invention in close comparison to the results using a well-known laboratory rheology meter. For four materials, rheological results are show at 210° C. and 230° C., and for two materials, rheological results are shown at 195° C. and 215° C. The graphs show the measured and predicted viscosity η using a power-law fluid model on the Y-axis plotted to the strain rate on the X-axis. The graphs show results from the system and method of the present invention in close agreement with the results from a well-recognized (and expensive) rotational Thermo Scientific™ HAAKE™ MARS™ 40 rheometer.

The below Table 1 of results using the system and method of the invention compared to the well-known laboratory rotational MARS rheometer shows close agreement of constants in a fluid model for rheological properties from tests using six examples of commercial polymer (including the two carbon-fiber filled polymer composite) filaments referenced in FIGS. 4A and 4B. The materials were tested at commercially customary temperatures for material deposition and the power-law index n and flow consistency index k were determined. The results from the system and method of the present invention compared to the MARS rheometer show a close correspondence.

TABLE 1

| Filament | Temp (° C.) | Invention n | Invention k | Mars 40 Rheometer n | Mars 40 Rheometer k |
| --- | --- | --- | --- | --- | --- |
| #1 | 210 | 0.445 | 15.0 | 0.439 | 15.4 |
|  | 230 | 0.529 | 6.75 | 0.519 | 6.99 |
| #2 | 210 | 0.360 | 24.0 | 0.349 | 24.9 |
|  | 230 | 0.436 | 12.2 | 0.422 | 12.5 |
| #3 | 210 | 0.566 | 17.5 | 0.555 | 18.3 |
|  | 230 | 0.665 | 5.66 | 0.654 | 5.97 |
| #4 | 195 | 0.597 | 7.50 | 0.599 | 7.70 |
|  | 215 | 0.679 | 3.17 | 0.690 | 3.03 |
| #5 | 210 | 0.448 | 21.5 | 0.435 | 20.2 |
|  | 230 | 0.558 | 7.16 | 0.544 | 6.84 |
| #6 | 195 | 0.668 | 4.41 | 0.685 | 3.79 |
|  | 215 | 0.760 | 1.50 | 0.778 | 1.30 |

An output of the system and method disclosed herein is the creation of anew index for characterizing the flow of the polymer, herein termed a "Filament Flow Index" ("FFI"). An FFI based on the results of the system and method can allow consumers to quickly assess extrusion characteristics for an FFF filament. This index can be a single number, in this case a force, which is measured at a set flow rate and temperature. The FFI is quick to compute once the data has been determined and can be derived directly from the measured outputs of the system. The polymer industry uses a similar index called the "melt flow index" that provides a single number, in this case seconds of flow, which is measured at a set temperature and applied force. Melt flow indexers are widely used and commercially available. However, melt flow indexers require that the user melt a batch of polymer prior to extruding the material as flow rate is measured. The FFI avoids the separate process.

Using the materials #1 through #6 in Table 1, the below Table 2 shows examples of FFI values, where the FFI is expressed in terms of a force unit ("N"), for example, at a given stepper motor rotational speed ("RPM") (that is directly proportional to a volumetric flow rate as detailed above) and processing temperature. Other measurements of speed can be used.

TABLE 2

| | Parameters | | | | | |
| --- | --- | --- | --- | --- | --- | --- |
| | #1 | #2 | #3 | #4 | #5 | #6 |
| Stepper Motor Speed (RPM) | 1.2 | 1.2 | 1.2 | 1.2 | 1.2 | 1.2 |
| Processing Temperature ° C. | 230 | 230 | 230 | 230 | 215 | 215 |
| Force (N) | 3.00 | 3.33 | 4.35 | 4.97 | 1.41 | 2.06 |

The invention has been described in the context of preferred and other embodiments and not every embodiment of the invention has been described. Obvious modifications include system and component variations that have similar functions, variations in the fluid modeling that compute different parameters and/or constants, different shaped liquefiers and accompanying nozzles, variations in the type of inverse analysis having data but backwardly computing the formula with parameters and/or constants, different nonlinear curve fitting methods, and other alterations to the described embodiments that are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of the following claims.

The invention claimed is:

1. A system for determining rheological properties of a polymer filament having a filament cross section area, comprising:
   a filament feeding system configured to feed the filament through the filament feeding system and determine a speed of the filament passing through the filament feeding system;
   a liquefier configured to at least partially melt the filament, the liquefier having a nozzle with a nozzle flow path, the nozzle flow path having at least a region of a smaller cross-sectional area than a cross-sectional area of the filament through the filament feeding system;
   a force transducer coupled to the liquefier and configured to provide force data to measure a filament force caused by the filament feeding system on the liquefier nozzle through feeding the filament, and
   a temperature sensor for measuring temperature of the liquefier, the at least partially melted filament, or a combination thereof;
   wherein the system is configured to determine values for one or more rheological model constants of a non-Newtonian fluid.

2. The system of claim 1, further comprising a controller configured to control the polymer melt temperature at a desired temperature.

3. The system of claim 1, further comprising a controller configured to control the filament feeding system at a desired filament speed in relation to a desired filament force.

4. The system of claim 1, wherein the filament speed is determined by measuring a rotational speed of a motor, gear, roller, or a combination thereof on the filament feeding system.

5. The system of claim 1, wherein the system is configured to compute values for the one or more rheological model constants based on the filament force and a volumetric flow rate dependent on the filament cross-sectional area and filament speed.

6. The system of claim 5, wherein the values for the one or more rheological model constants can be determined independent of a determination of an apparent viscosity from a shear stress and a strain rate.

7. A method of determining rheological properties of a polymer filament based on force and volumetric flow rate in a system having a filament feeding system, a liquefier having a nozzle, a force transducer, and a temperature sensor, comprising:
   feeding the filament through the filament feeding system;
   heating the liquefier and at least partially liquefying the filament for passing through the nozzle;
   measuring a filament force caused by the filament feeding system to feed the filament through the nozzle;
   measuring a filament speed through the system to determine a filament volumetric flow rate through the system;
   forming multiple data sets of filament force with filament volumetric flow rate;
   applying the filament force and the volumetric flow rate to a fluid model having one or more rheological model constants to derive a relationship formula of the filament force and volumetric flow rate to the fluid model; and
   determining values for the one or more rheological model constants by applying the data sets of filament force with filament volumetric flow rate to fluid model.

8. The method of claim 7, further comprising controlling filament speed, temperature, or both based on the values.

9. The method of claim 7, wherein determining the values for the one or more rheological model constants by applying the data sets of filament force with filament volumetric flow rate is independent of determining an apparent viscosity from a shear stress and a strain rate.

10. The method of claim 7, wherein the filament comprises a non-Newtonian material and the fluid model comprises an inverse analysis solution.

11. The method of claim 7, wherein the rheological fluid model having one or more rheological model constants comprises power law constants n and k that define the rheological properties for a given material for controlling deposition parameters of the filament material.

12. The method of claim 7, wherein applying the filament force and the volumetric flow rate to the fluid model having one or more rheological constants to derive a relationship formula comprises modeling the forces needed in each region to feed the filament through the nozzle.

13. The method of claim 7, wherein the fluid model having one or more rheological constants to derive a relationship formula comprises a nonlinear relationship and determining the values for the one or more rheological constants comprising applying non-linear curve fitting an inverse analysis to the nonlinear relationship to determine the values for the one or more rheological constants.

14. The method of claim 7, wherein applying the filament force and the volumetric flow rate to a fluid model having one or more rheological constants to derive a relationship formula of the filament force and volumetric flow rate to the fluid model comprises establishing relationships between filament force, filament speed, volumetric flow rate, and drop in pressure with one or more unknown constants in a nonlinear relationship and determining the rheological constants comprises applying an inverse analysis to the nonlinear relationship with the data sets of filament force with filament volumetric flow rate.

15. A system for determining rheological properties of a polymer filament having a filament cross section area, comprising:
   a filament feeding system configured to feed the filament through the filament feeding system and determine a speed of the filament passing through the filament feeding system;
   a liquefier configured to at least partially melt the filament, the liquefier having a nozzle with a nozzle flow path, the nozzle flow path having at least a region of a smaller cross-sectional area than a cross-sectional area of the filament through the filament feeding system;
   a force transducer coupled to the liquefier and configured to provide force data to measure a filament force caused by the filament feeding system on the liquefier nozzle through feeding the filament, and
   a temperature sensor for measuring temperature of the liquefier, the at least partially melted filament, or a combination thereof;
   wherein the system is configured to determine values of rheological model constants independent of a determination of an apparent viscosity.

* * * * *